US011480249B2

(12) United States Patent
Doman et al.

(10) Patent No.: US 11,480,249 B2
(45) Date of Patent: Oct. 25, 2022

(54) SEAL MEMBER

(71) Applicant: Marthinus Hendrik Doman, Boyle (CA)

(72) Inventors: Marthinus Hendrik Doman, Boyle (CA); Qinghai Jin, Edmonton (CA)

(73) Assignee: Marthinus Hendrik Doman, Boyle (CA)

( * ) Notice: Subject to any disclaimer, the term of this patent is extended or adjusted under 35 U.S.C. 154(b) by 83 days.

(21) Appl. No.: 17/006,544

(22) Filed: Aug. 28, 2020

(65) Prior Publication Data

US 2021/0396317 A1   Dec. 23, 2021

(30) Foreign Application Priority Data

Jun. 19, 2020   (CA) ................................ CA 3084367

(51) Int. Cl.
*F16J 15/3204*   (2016.01)
*F16J 15/06*   (2006.01)

(52) U.S. Cl.
CPC .......... *F16J 15/3204* (2013.01); *F16J 15/06* (2013.01)

(58) Field of Classification Search
CPC .... F16J 15/00; F16J 15/16; F16J 15/50; F16J 15/52; F16J 15/32; F16J 15/3204; F16J 15/3208; F16J 15/3216; F16J 15/322; F16J 15/3232; F16J 15/02; F16J 15/46; F16J 15/48; F16J 15/06; F16J 15/061; F16J 15/062
USPC ....................................................... 277/628
See application file for complete search history.

(56) References Cited

U.S. PATENT DOCUMENTS

| | | | |
|---|---|---|---|
| 3,885,799 A | 5/1975 | Bibbens | |
| 4,679,994 A | 7/1987 | Brown | |
| 4,716,962 A | 1/1988 | Rundell | |
| 4,854,834 A | 8/1989 | Gschwender et al. | |
| 5,369,914 A * | 12/1994 | Takeuchi | B60J 10/24 49/475.1 |
| 5,515,619 A | 5/1996 | Kahl et al. | |
| 5,682,002 A | 10/1997 | Marder | |
| 5,685,088 A | 11/1997 | Nakamura | |
| 5,833,245 A | 11/1998 | Gallagher | |

(Continued)

FOREIGN PATENT DOCUMENTS

| CA | 2780546 | 12/2013 |
|---|---|---|
| CA | 2858272 | 8/2015 |

OTHER PUBLICATIONS

"Extrusion PVC Rubber Sealing Strip Window Frame Wooden Door Groove Sealed Silicone TPE Weatherstrip," product data sheet, downloaded from Tianjin Wortai International Trade Co., Ltd. website, Apr. 3, 2020, 7 pages.

(Continued)

*Primary Examiner* — Nathan Cumar
(74) *Attorney, Agent, or Firm* — Lowe Graham Jones PLLC

(57) ABSTRACT

A seal for sealing between first and second grooves, the seal comprising a first sealing part for sealing against the first groove and a second sealing part extending from the first seal, the second sealing part having a convex cross-section relative to the seal for providing at least two sealing contact points against the second groove. The second sealing part provides a mandibular structure with chin-like protrusions which may improve conformation to the natural surface irregularities of the sealing surfaces.

13 Claims, 4 Drawing Sheets

(56) References Cited

U.S. PATENT DOCUMENTS

| | | | |
|---|---|---|---|
| 5,876,566 | A | 3/1999 | Frawley, Jr. |
| 6,131,342 | A * | 10/2000 | Miyamoto ............... B60J 10/24 |
| | | | 49/484.1 |
| 6,269,683 | B1 | 8/2001 | Jackson |
| 6,317,477 | B1 | 11/2001 | Matteson |
| 6,431,825 | B1 | 8/2002 | McLean |
| 6,679,003 | B2 * | 1/2004 | Nozaki ................. B60J 5/0402 |
| | | | 49/441 |
| 7,343,969 | B1 | 3/2008 | Busch et al. |
| 7,608,316 | B2 * | 10/2009 | Okajima ................ B29C 48/13 |
| | | | 428/122 |
| 7,661,336 | B2 | 2/2010 | Hohmann et al. |
| 8,037,933 | B1 | 10/2011 | Levy |
| 8,333,295 | B1 | 12/2012 | Parker et al. |
| 8,505,875 | B2 | 8/2013 | Mahr et al. |
| 8,534,633 | B2 | 9/2013 | Tell |
| 8,608,010 | B2 | 12/2013 | Constantin et al. |
| 9,038,479 | B2 | 5/2015 | Langer |
| 10,279,286 | B2 | 5/2019 | Mikkola et al. |
| 2003/0034156 | A1 | 2/2003 | Gondouin |
| 2006/0005486 | A1 * | 1/2006 | Robinson ............... A47K 3/008 |
| | | | 52/211 |
| 2007/0039787 | A1 | 2/2007 | Scheckelhoff et al. |
| 2007/0045969 | A1 | 3/2007 | Cairns |
| 2007/0113482 | A1 * | 5/2007 | Dumke ................... B60J 10/33 |
| | | | 49/498.1 |
| 2008/0029972 | A1 | 2/2008 | Smathers et al. |
| 2010/0308541 | A1 | 12/2010 | Kuemmel et al. |
| 2012/0091141 | A1 | 4/2012 | Thielbar |
| 2012/0112102 | A1 | 5/2012 | Stadler et al. |
| 2018/0172004 | A1 | 6/2018 | Lee et al. |
| 2018/0313035 | A1 | 11/2018 | Reaves, III et al. |

OTHER PUBLICATIONS

Gannon, M., "Assessing and managing rod seal friction in hydraulic applications," hallite.com/us/, Feb. 1, 2019, 8 pages.

"Icemax(tm) Composite Coolers," product data sheet, downloaded from www.icemaxcoolers.com, Apr. 6, 2020, 1 page.

"Kalrez(R) TriLobe(TM) Seals," article, downloaded from DuPont website, Apr. 6, 2020, 2 pages.

"Lipped Seal / V-Ring / Grooved / Elastomer," product data sheet, Kastas Sealing Technologies, Turkey, Apr. 3, 2020, retrieved from the Internet at directindustry.com/prod/kastas-sealing-technologies/product-67817-1589532.html, 1 page.

"PVC/TPE/Silicon Sealing Strips Wooden Door Window Frame Groove Seals," product data sheet, Hangzhou Zoinen Sealing Technology Limited, Zhejiang, China, Dec. 18, 2019, downloaded from www.made-in-china.com, 5 pages.

Welker, A., "How to Replace Walk-in Refrigerator Door Gaskets," U.S. Cooler, Nov. 6, 2009, downloaded from Cooler Connection blog, Apr. 6, 2020, 4 pages.

\* cited by examiner

SEAL MEMBER

PRIORITY CLAIM

This application claims the benefit of priority from Canadian Patent Application No. 3084367, filed Jun. 19, 2020, which application is incorporated herein by reference in its entirety.

FIELD OF THE INVENTION

The invention relates to a structure for providing a seal between two surfaces.

BACKGROUND OF THE INVENTION

Seals may be employed between adjacent structures in devices and systems to separate fluid regions for purposes such as maintaining pressure differentials or reducing energy transfer between regions of different temperatures. In some existing seals, a sealing structure inserts under compression into grooves in each of the adjacent structures. The elastic restoring force of the sealing structure presses a surface of the seal against a surface of the groove, providing friction and generally preventing or restricting fluid communication between the fluid regions on each side of the seal.

SUMMARY OF THE INVENTION

There is provided in one embodiment a sealing structure comprising at least one mandibular sealing section, the mandibular sealing section comprising at least one chin-like protrusion.

There is provided in one embodiment a structure, comprising: a body having a body groove; a lid having a lid groove, the lid mounted on the body; a seal seated in one of the body and lid grooves and the seal engages between the lid groove and the body groove, the seal is configured to be more tightly fit in one of the lid groove and the body groove than the other.

In various embodiments, there may be included any one or more of the following features: the structure is a cooler; the seal further comprises a first sealing part for sealing against one of the body groove and the lid groove, and a second sealing part extending from the first sealing part, the second sealing part having a convex cross-section relative to the seal for providing at least two sealing contact points against the other of the body groove and the lid groove; the first sealing part seals against the lid groove.

There is provided in one embodiment a seal for sealing between a body having a body groove and a lid having a lid groove, in which the lid is mountable on the body, and in which the seal is configured to seat in one of the body and lid grooves and the seal engages between the lid groove and the body groove, the seal is configured to be more tightly fit in one of the lid groove and the body groove than the other.

In various embodiments, there may be included any one or more of the following features: the seal further comprises a first sealing part configured to seat in the lid groove, a second sealing part configured to seat in the body groove, in which the first sealing part comprises a plurality of gripping fins, the fins when seated in the groove are oriented to resist movement of the seal out of the lid groove, and the second sealing part having a convex cross-section relative to the seal for providing at least two sealing contact points against the body groove; the second sealing part further comprising rounded edges that contact walls of the body groove.

There is provided in one embodiment a seal for sealing between first and second grooves, the seal comprising: a first sealing part for sealing against the first groove; and a second sealing part extending from the first seal, the second sealing part having a convex cross-section relative to the seal for providing at least two sealing contact points against the second groove.

In various embodiments, there may be included any one or more of the following features: the second sealing part further comprises a first protrusion and a second protrusion; the first and second protrusions are rounded; the first seal further comprises a first outwardly extending fin having an exterior end and the second sealing part extends from the exterior end of the first outwardly extending fin; the first seal comprises a plurality of gripping fins, the fins when seated in the groove are oriented to resist movement of the seal out of the first groove; the first protrusion is at a distal end of the second sealing part; the second protrusion is in a central position between the distal end of the second sealing part and a base of the second sealing part; the first seal further comprises a second outwardly extending fin extending in the opposite direction from the first outwardly extending fin and having a concave surface facing the second sealing part; the second sealing part further comprises a lower lip configured to contact the concave surface when in a sealing position; a distance between the first and second protrusions is approximately the same as the distance between the second protrusion and the base on the second sealing part; the angle formed between the first protrusion, the second protrusion and the base on the second sealing part is between 90 and 135 degrees; in use, the seal is used to seal between areas having different pressures and the second sealing part is connected to the first seal at a lower pressure side of the seal; the seal comprises a flexible material; the seal is for use in sealing between a lid and a body of a cooler.

These and other aspects of the system and method are set out in the claims, which are incorporated here by reference.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
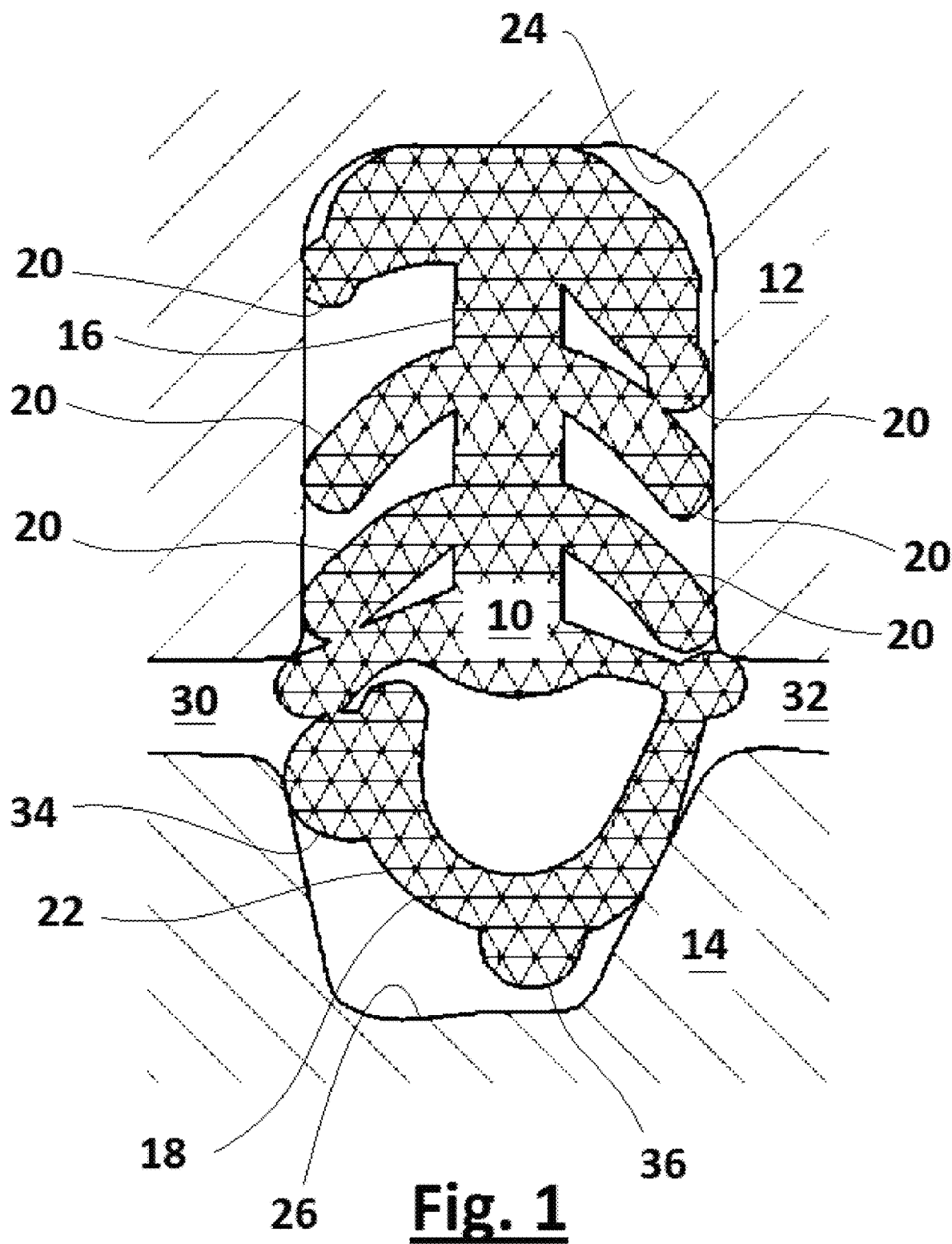
FIG. 1 is a cross-section of a sealing strip according to an embodiment.
Figure 2:
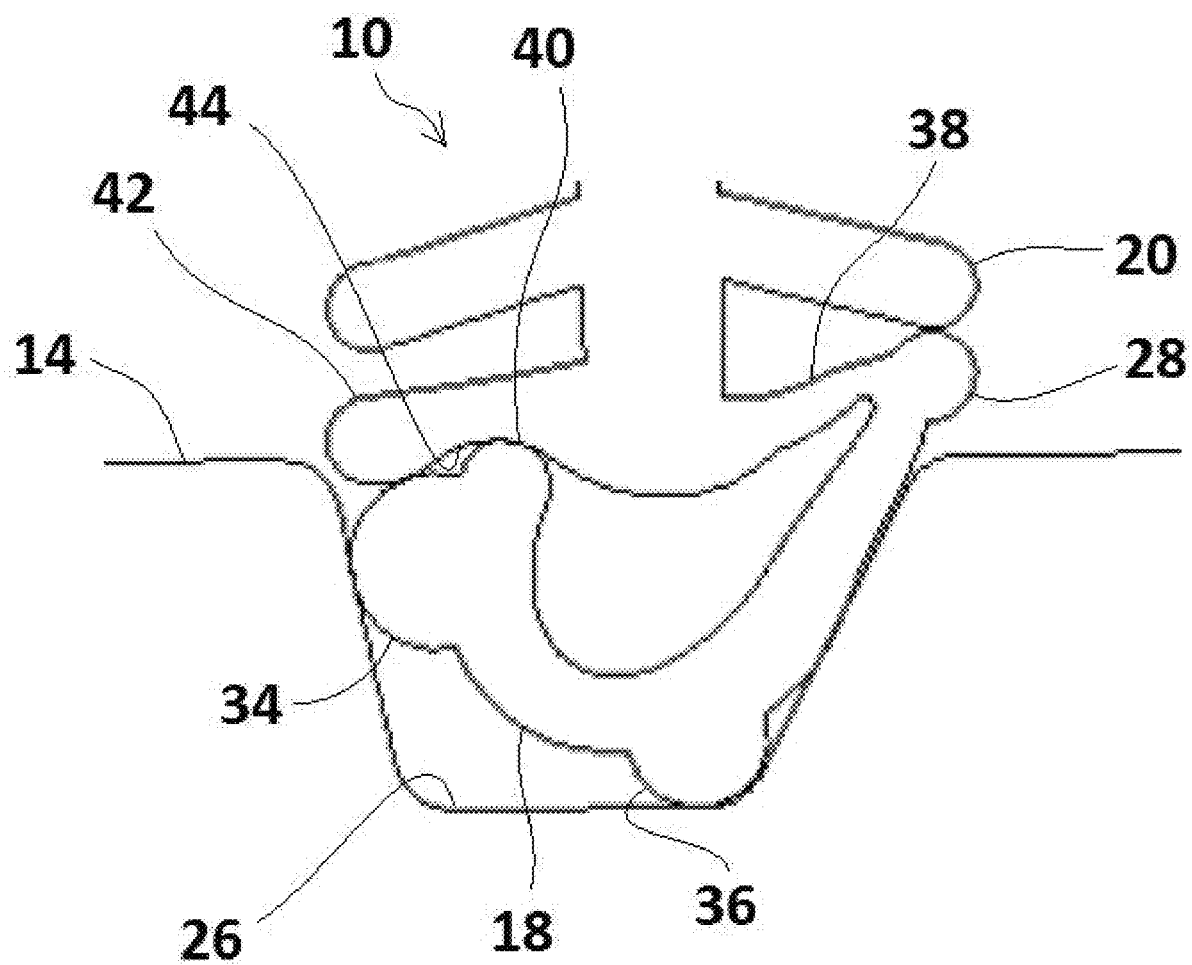
FIG. 2 is a detail view of the mandible section of a sealing strip according to the embodiment of FIG. 1.
Figure 3:
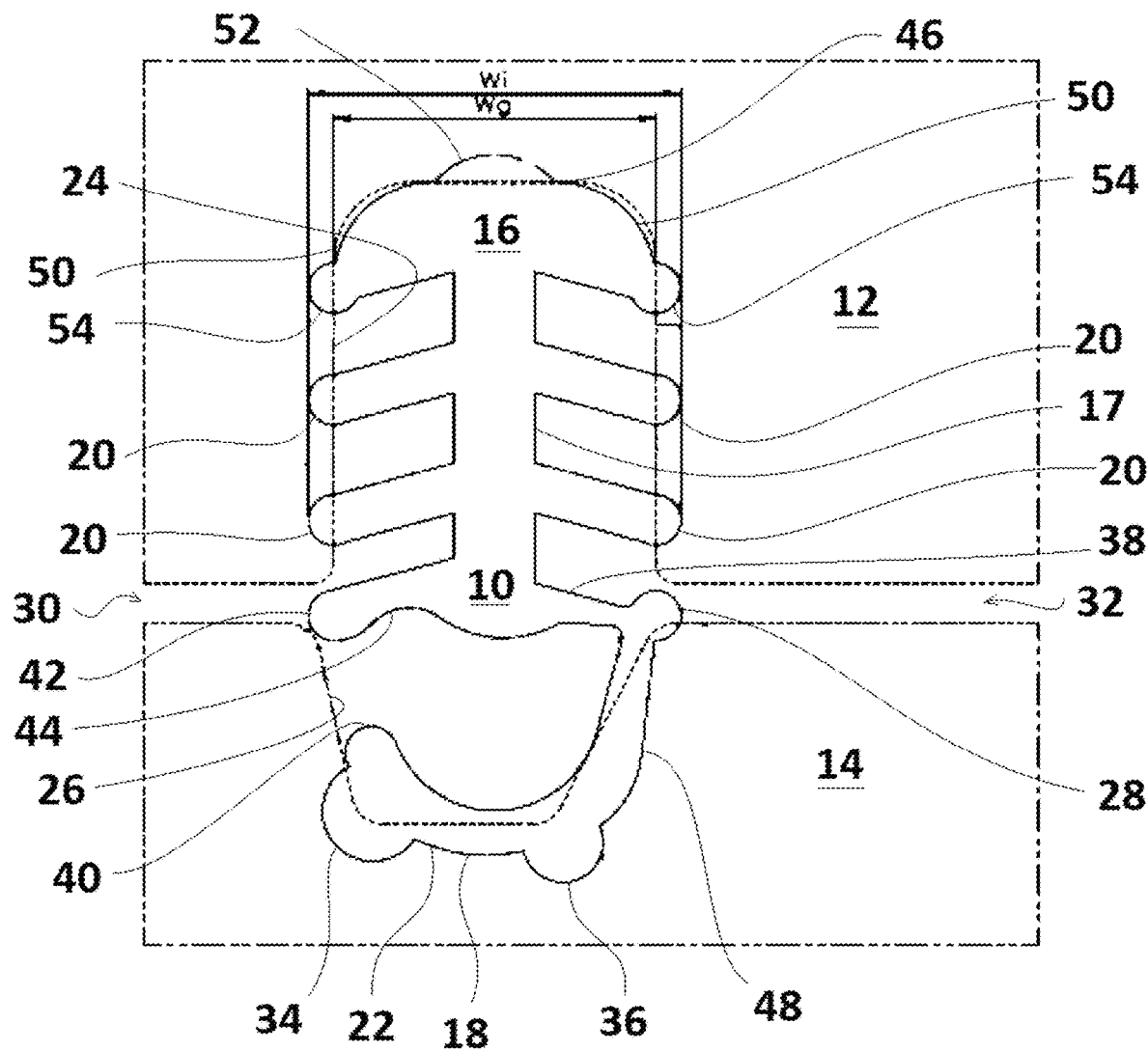
FIG. 3 is a cross-section of an unstressed sealing strip overlaid over a cross-section of first and second mating parts according to the embodiment of FIG. 1.

In FIGS. 1-3, there is disclosed an embodiment of a seal 10 that seals between a first body 12 and a second body 14 of a structure. In the embodiment shown, seal 10 forms a self-suction seal strip. In a preferred embodiment the structure is a cooler having a pressure differential between the interior of the cooler and the surrounding environment, such as is disclosed in Canadian Patent Application No. 2,858, 272 published on Aug. 4, 2015 by Marthinus Doman. By providing reduced atmospheric oxygen in the interior of the cooler, the growth of aerobic bacteria or fungi may be limited, and evaporation of volatile components may be prevented. An effective seal is important for maintaining the reduced pressure interior of the cooler and thereby maintaining food freshness. Embodiments of seal 10 disclosed herein may provide improved sealing. Seal 10 may also be used in other industries where improved sealing is desired such as, for example, dynamic and static hydraulic or gas leakage applications.

Seal 10 includes a first sealing portion 16 and a second sealing portion 18, in which first sealing portion 16 mates with a groove 24 in a surface of first body 12 and second sealing portion 18 mates with a groove 26 in a surface of second body 14. In a preferred embodiment, seal 10 is made from a flexible material.

Seal 10 has gripping fins 20, for example, as shown on first sealing portion 16. As shown in FIG. 1, gripping fins 20 may be elastically deformable opposing fins. First sealing portion 16 may insert into a corresponding groove using an interference fit. An interference fit may be provided by pairs of opposing gripping fins 20 on either side of a stem 17. One or more pairs of fins span a width greater than the width of groove 24 in a surface of one of first and second bodies 12, 14. Insertion of first sealing portion 16 into groove 24 causes deformation of gripping fins 20. The elastic restoring force on gripping fins 20 applies pressure to groove 24 causing friction and sealing contact between the surfaces. Various numbers of pairs of gripping fins may be used.

The second sealing portion 18 may also insert by an interference fit into a corresponding second groove 26. FIG. 2 illustrates an exemplary second sealing portion 18 inserted into second groove 26. Referring to FIG. 1, the insertion of first sealing portion 16 into first groove 24 and of second sealing portion 18 into second groove 26 produces a seal between a first fluid region 30 and a second fluid region 32.

Referring to FIG. 3, the second sealing portion 18 includes a curved structure extending away from first sealing portion 16, forming a sealing structure with a convex cross-section relative to first sealing portion 16. The curved structure may be characterized as having a shape resembling approximately the mandible or jaw of an animal or human. There are two opposing bottom fins in which first bottom fin 42 extends in a direction towards first fluid region 30, and second bottom fin 38 extends in a direction towards second fluid region 32. An angular connecting point 28 provides a joint between first sealing portion 16 and second sealing portion 18 at an end of second bottom fin 38. Angular connecting point 28 connects the second sealing portion 18 to the remainder of seal 10. Angular connecting point 28 corresponds approximately with the condylar process of an anatomical mandible. Angular connecting point 28 may be elastically deformable and may provide a location for flexion of second sealing portion 18 relative to first sealing portion 16.

The second sealing portion 18 may have at least two protrusions extending away from the direction of curvature of the general mandibular shape. As shown in FIG. 1, a first protrusion 34 corresponds approximately to the chin or mental protuberance of an anatomical mandible. First protrusion 34 may be at or near an end of the second sealing portion 18 most distant from first sealing portion 16. This end of the second sealing portion 18 may be referred to as lower lip 40 corresponding approximately to the location of an anatomical lower lip. First bottom fin 42 similarly corresponds approximately to the location of an anatomical upper lip.

A second protrusion 36 corresponds approximately to the mandibular angle of an anatomical mandible, being located at or near an approximately central position between the distal end of second sealing portion 18 and the joint between first and second sealing portions 16, 18, i.e. the base of second sealing portion 18. A mandibular body 22 connects first protrusion 34 and second protrusion 36 and corresponds to the body (or base) of an anatomical mandible. A connecting section 48 connects second protrusion 36 and angular connecting point 28 and corresponds approximately to the ramus of an anatomical mandible. In some embodiments, mandibular body 22 and connecting section 48 are each approximately the same length and the distance between first protrusion 34 and second protrusion 36 is approximately the same length as the distance between second protrusion 36 and angular connecting point 28. In some embodiments, the angle formed between the first protrusion, the second protrusion and the base on the second sealing part is between 90 and 135 degrees. In other words, the angle formed at the connection between the mandibular body 22 and connecting section 48 is between 90 and 135 degrees. Different designs of second sealing portions may be used to provide a convex cross-section which provide multiple sealing contact points within a groove.

In some embodiments, the cross-sectional thickness of the material of second sealing portion 18 may vary over the length of one or each of mandibular body 22 and connecting section 48, and one or each of mandibular body 22 and connecting section 48 may have any of a variety of shapes. For example, they may be straight, have regions of curvature, or have corners.

In some embodiments the cross-sectional thickness of the material of at least a portion of each of mandibular body 22 and connecting section 48, may be less than the thickness of second sealing portion 18 at one or both of first protrusion 34 and second protrusion 36. In some embodiments, one or more of first and second protrusions may be rounded. Similarly, one or more of mandibular body 22 and connecting section 48 may have rounded surfaces. Rounded surfaces may provide better sealing across uneven surfaces.

FIG. 3 illustrates a cross-section of a seal 10 in a non-inserted configuration overlaid over a cross-section of first and second bodies 12, 14. The width of non-compressed seal components including gripping fins 20, Wi, is greater than the width of corresponding groove 24, Wg. Similarly, in the non-inserted configuration the mandibular shape of second sealing portion 18 is larger than corresponding groove 26.

Insertion of first sealing portion 16 into groove 24 produces an interference fit in which elastic deformation of gripping fins 20 causes friction and sealing contact. Insertion of second sealing portion 18 into groove 26 causes the structure of second sealing portion 18 to bend elastically as the mandible structure closes, as illustrated in FIGS. 1 and 2. In some embodiments, bending may occur at one or more multiple or regions along second sealing portion 18. For example, the bending of second sealing portion 18 may substantially occur at angular connecting point 28, with lesser amounts of deformation occurring along mandibular body 22 and connecting section 48.

In the inserted, or sealing, configuration second sealing portion 18 may be bent or deformed so that lower lip 40 contacts a concave interior surface 44 on an inside edge of first bottom fin 42. In the anatomical analogy, this corresponds approximately to the upper and lower lips meeting when the jaw closes. Sealing contact between lower lip 40 and concave interior surface 44 creates a closed fluid region in the interior space of the mandibular shape, i.e. in the mouth. The sealing configuration also causes sealing contact points at first and second protrusions 34, 36. Depending on the shape of mandibular body 22 and connection section 48 there may be additional or alternative sealing contact points along the exterior of second sealing portion 18. The size and shape of protrusions 34, 36 and the shape of groove 26 create a closed fluid region on the exterior of second sealing portion 18 between mandibular body 22 and groove 26. The two parallel protrusions 34, 36 may also provide lateral stability which can help to maintain smooth surfaces without wrinkles caused by suction of pressure differences. The smoother contact between surfaces can improve the seal despite pressure differentials. In addition, protrusions 34, 36 on the mandible can keep themselves in alignment with each other after being pressed inside the seal grooves when installed and under pressure suction. Protrusions 34, 36 are kept in parallel for both straight and curved grooves. The design of protrusions 34, 36 provide flexibility for the seal 10 to fit into various designs of grooves. The convex cross-section of second sealing portion 18 is shaped and configured to provide at least two contact surfaces between groove 26 and second sealing portion 18. As shown in FIG. 1, second sealing portion 18 contacts groove 26 at two points on opposite sides of the groove walls. Multiple contact surfaces can provide a section of reduced pressure between contact points where second sealing portion contacts groove 26. An area of reduced pressure can assist in providing suction to produce a stronger seal and a flow path separation between high pressure and lower pressure sides of seal 10. In FIG. 1, protrusion 34 contacts the wall of groove 26 adjacent to first fluid region 30 and connecting section 48 (FIG. 3) contacts the wall of groove 26 adjacent to second fluid region 32. As shown in FIG. 2, there are three sealing contact positions because in addition to the sealing contact positions shown in FIG. 1, protrusion 36 contacts between one of the walls and the base of groove 26. Depending on the shape of the convex cross-section of second sealing portion 18 there may be two or more contact positions with a groove such as groove 26 along various parts of second sealing portion 18.

One or more further closed fluid regions may be produced depending on the shape and size of protrusions 34, 36, shape of groove 26 and the shape of mandibular body 22 and connecting section 48. For example, a further closed fluid region may be produced between connecting section 48 and groove 26 adjacent to second protrusion 36 due to a lesser thickness at connecting section 48 relative to second protrusion 36. Each closed fluid region, also referred to as a sealing chamber, may reduce the pressure gradients and separate the flow paths.

Each closed fluid region may provide a pressure differential relative to each other and first and second fluid regions 30, 32 that improves the quality of the seal at one or more of the contact points. For example, a higher pressure in the closed fluid region on the interior of the mandible, i.e. the mouth relative to the closed fluid region between mandibular body 22 and groove 26, i.e. under the chin, increases the force on each of first and second protrusions 34, 36 thereby increasing friction and stability of the seal.

Higher pressure in the closed fluid region of the mouth may also cause deformation of second sealing portion 18 increasing the contact surface area between the second sealing portion 18 and groove 26. For example, this may occur along connecting section 48. The increased contact surface area may further improve the stability and quality of the seal.

First fluid region 30 and second fluid region 32 may include fluids of similar or different compositions. A pressure differential between first fluid region 30 and second fluid region 32 may affect the operation of seal 10. In some embodiments, a higher pressure in first fluid region 30 relative to second fluid region 32 may cause displacement and elastic deformation of parts of seal 10. The deformation or displacement due to higher pressure in first fluid region 30 may include bending at angular connecting point 28, compressing the closed fluid region in the mouth of the second sealing portion. This increases the pressure in that closed fluid region, thereby applying greater force through first and second protrusions 34, 36 to the surface of groove 26, thereby strengthening the seal.

In some embodiments, first sealing portion 16 may further include crown 46 at a top end of first sealing portion. Crown 46 may include one or more pairs of opposing gripping fins 50 and a convex protrusion 52 extending towards the bottom surface of the groove. Gripping fins 50 may have a cross-sectional thickness greater than the thickness of gripping fins 20. Gripping fins 50 may include tips 54, each tip 54 having a smaller thickness than the body of gripping fins 50. Convex protrusion 52 may be flattened into the surface of groove 24 when first sealing portion 16 is inserted. The elastic restoring force of convex protrusion 52 due to the flattening creates increased pressure, friction and improved sealing contact where convex protrusion 52 meets the surface of groove 24. The reduced thickness of tips 54 of gripping fins 50 may create closed fluid regions (sealing chambers) at corners of groove 24, as illustrated in FIG. 1.

Seal 10 may be formed into a one-piece extruded seal strip having rounded lips, noses and convex shapes on features of seal 10 including gripping fins, mandible and crown. The mandible-type sealing strip with chins, such as for example protrusions 34, 36, and lips, such as for example lower lip 40 and first bottom fin 42, allows the sealing member to conform to the natural surface irregularities of the sealing surfaces and increases the contact pressure of chins on groove surfaces compressed by pressure suction for better sealing performance.

The seal with mandibular sealing section may be used in sealing dynamic and static hydraulic or gas leakage applications. The mandibular seal is pressure energized with the pressure against the groove surface in the pressure gradient direction, statically balancing the seal. The mandibular section of the seal may be assembled with an interference fit allowing a positive and relatively low initial compression. A mandibular type seal can provide good sealing with friction at low to moderate pressures.

In some embodiments, first body 12 and second body 14 may be a container and a lid for the container. For example, first and second bodies 12, 14 may be a cooler and the lid of the cooler. First body 12 may be the lid with second body 14 comprising the container. In other embodiments, first body 12 may be the container and second body 14 may be the lid.

Figure 4A:
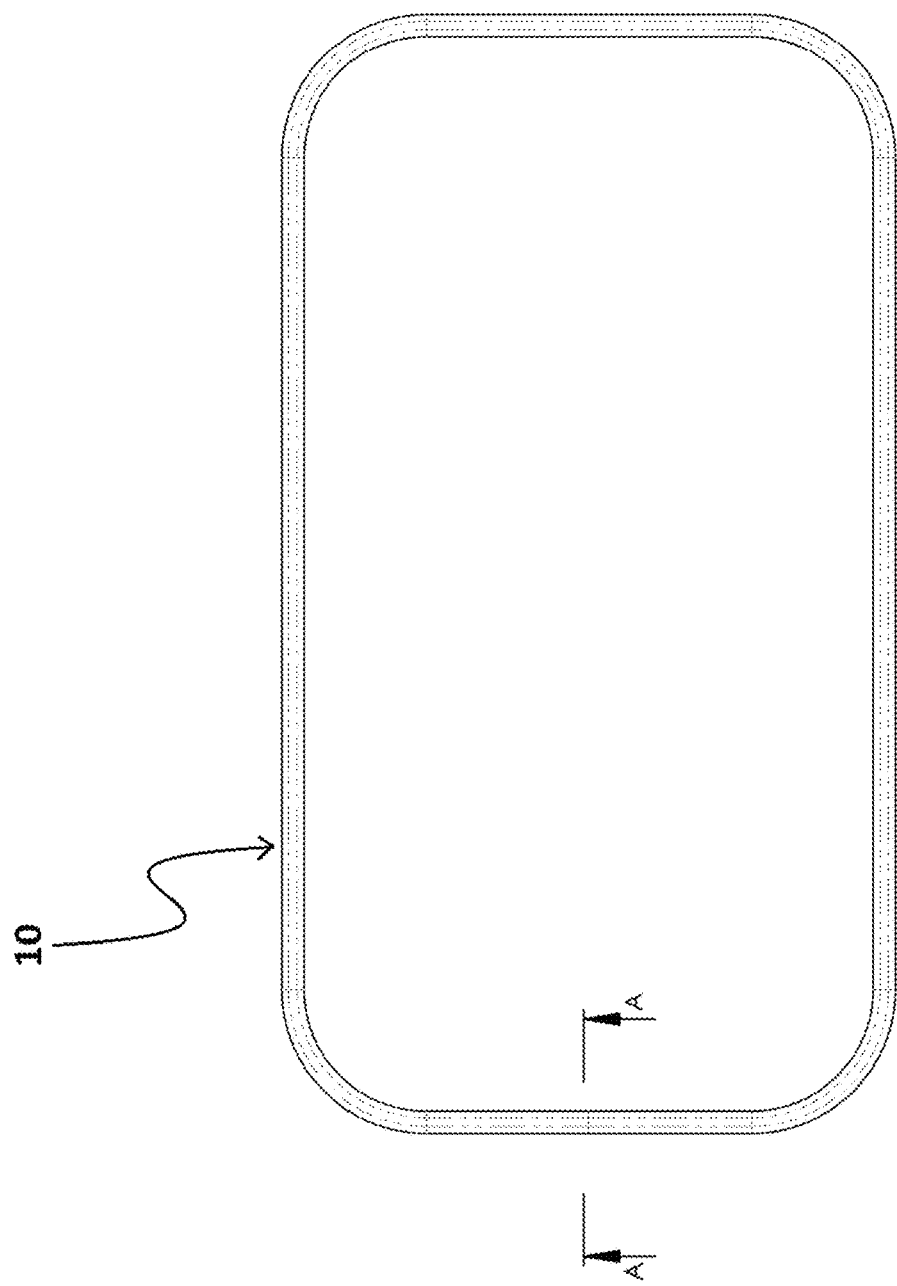
FIG. 4A is a plan view of a loop of sealing strip according to an embodiment.
Figure 4B:
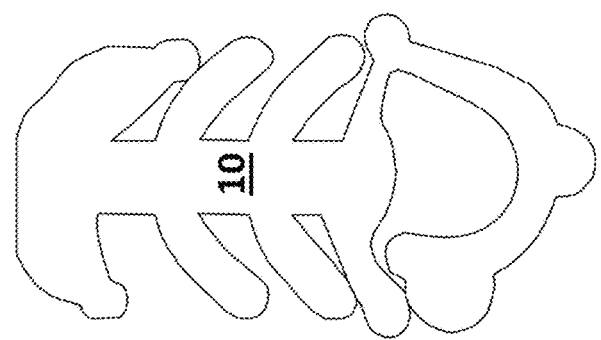
FIG. 4B is a cross-section of the loop of sealing strip of FIG. 4A taken through the line A-A.

The seal may be made from materials selected based on the pressure differential expected for the seal's anticipated use. Some applications for seal 10 include seals in industrial and commercial products including industrial and commercial coolers. In some embodiments, such as some applications including both vacuum sealing (negative pressure) of a cooler and positive pressure container sealing, the seal may be made from silicon rubber. The seal may be produced by extrusion of a single continuous strip according to the length required for the application. The ends extruded strips may be joined into a loop by hot melting the ends and fusing the ends together, as illustrated in FIGS. 4A and 4B. In an example embodiment in which first body 12 and second body 14 comprise a lid and cooler, a sealing strip may be produced from a single continuous extruded strip approximately 2400 mm long. A single continuous extruded strip may be produced in significant lengths. Strips may be extruded to the desired length or cut to the desired length out of longer stretches of material. In some other embodiments a single sealing strip may be produced from multiple discontinuous strips fused together end to end.

In a preferred embodiment, such as shown in FIG. 1, seal 10 is configured to be more tightly fit in groove 24 than groove 26. For example, seal 10 may be configured to more tightly fit into lid groove 24 than body groove 26. By being more tightly fit in the one groove than the other, the seal will remain in the more tightly fit groove when first and second bodies 12 and 14 are pulled apart, for example, when a cooler is opened. Gripping fins provide a greater resistive force to movement of the seal within the grooves than second sealing portion in its corresponding grooves. Different designs of seals could also be used to provide a difference between the fits of the bodies of the seal. If seal 10 were fit into each groove with the same tightness, seal 10 would be more likely to fall out of both grooves at the same time when the cooler or other structure were opened, which would increase the likelihood that the seal would be lost during use.

In some embodiments gripping fins 20 of first sealing portion 16 may be changed for alternative seal mounting arrangements. For example, first sealing portion 16 may include an insert (not shown) permanently affixed to groove 24 of first body 12, such as by glue or other suitable attachment. In some embodiments, gripping fins 20 of first sealing portion 16 may be changed for other self suction rooting structures.

Immaterial modifications may be made to the embodiments described here without departing from what is covered by the claims. For example, while the figures illustrate groove 24 having a rectangular shape with rounded corners and groove 26 having shallow, angled walls, other shapes, angles and depths for each groove may be used. Corresponding adjustments to the size and shape of first and second sealing portions 16, 18 may also be made. First sealing part 16 could be designed to be fixed to first body 12, for example using glues or other methods of attachment to ensure that the seal is permanently fixed within first body 12. In a preferred embodiment, seal 10 is not permanently fixed to either body to allow for easier maintenance or replacement.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A seal for sealing between first and second grooves, the seal comprising:
   a first sealing part for sealing against the first groove;
   a second sealing part extending from the first seal, the second sealing part having a convex cross-section relative to the seal for providing at least two sealing contact points against the second groove; and
   in which the first sealing part further comprises a first outwardly extending fin having an exterior end and the second sealing part extends from the exterior end of the first outwardly extending fin.

2. The seal of claim 1 in which the second sealing part further comprises a first protrusion and a second protrusion.

3. The seal of claim 2 in which the first and second protrusions are rounded.

4. The seal of claim 2 in which the first protrusion is at a distal end of the second sealing part.

5. The seal of claim 4 in which the second protrusion is in a central position between the distal end of the second sealing part and a base of the second sealing part.

6. The seal of claim 5 in which a distance between the first and second protrusions is approximately the same as the distance between the second protrusion and the base on the second sealing part.

7. The seal of claim 6 in which the angle formed between the first protrusion, the second protrusion and the base on the second sealing part is between 90 and 135 degrees.

8. The seal of claim 1 in which the first sealing part comprises a plurality of gripping fins, the fins when seated in the groove are oriented to resist movement of the seal out of the first groove.

9. The seal of claim 1 in which the first sealing part further comprises a second outwardly extending fin extending in the opposite direction from the first outwardly extending fin and having a concave surface facing the second sealing part.

10. The seal of claim 9 in which the second sealing part further comprises a lower lip configured to contact the concave surface when in a sealing position.

11. The seal of claim 1 in which, in use, the seal is used to seal between areas having different pressures and the second sealing part is connected to the first sealing part at a lower pressure side of the seal.

12. The seal of claim 1 in which the seal comprises a flexible material.

13. The seal of claim 1 for use in sealing between a lid and a body of a cooler.

* * * * *